United States Patent Office 3,378,118
Patented Apr. 16, 1968

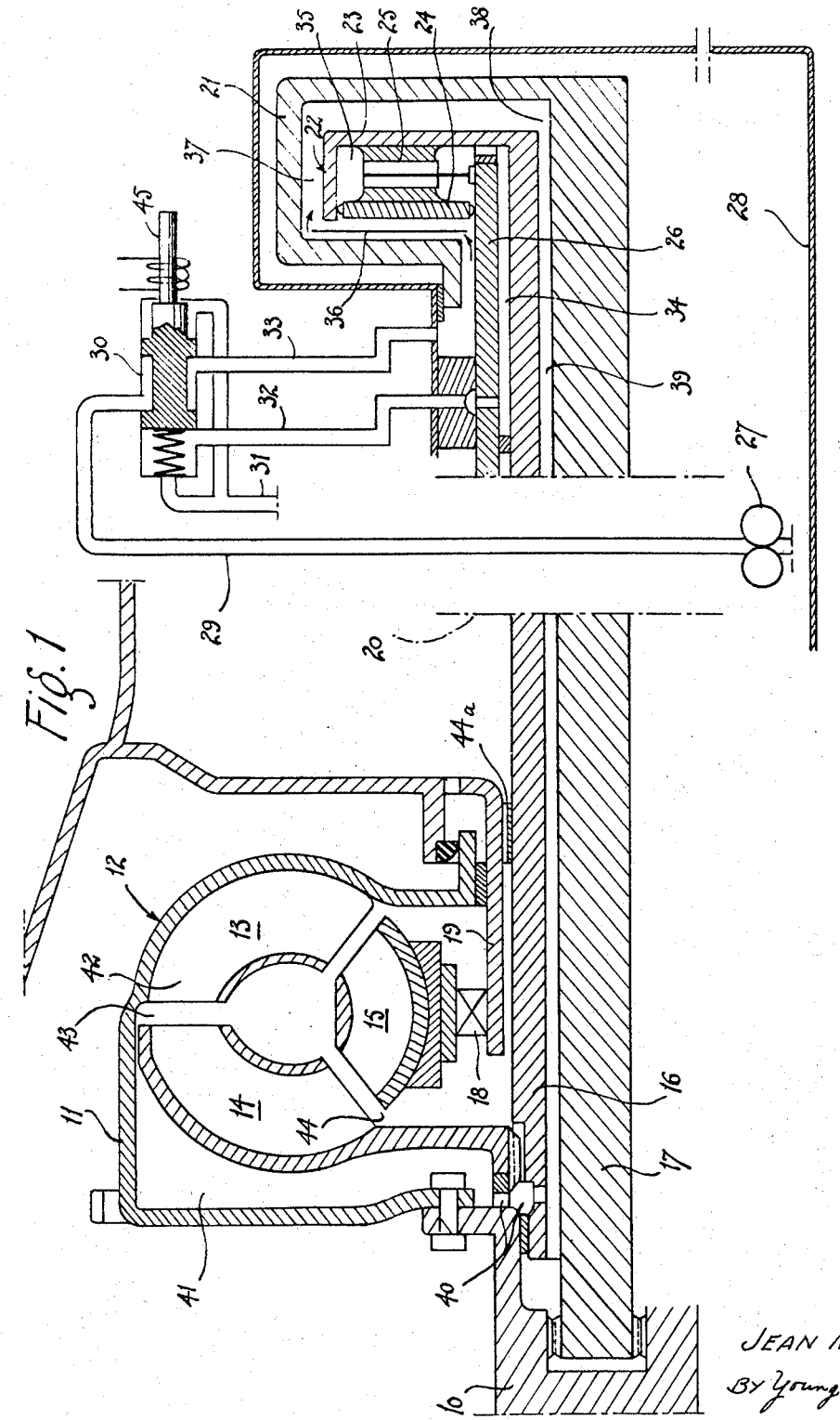

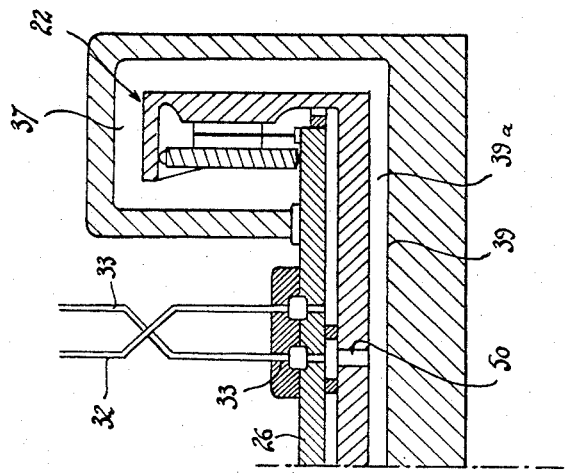
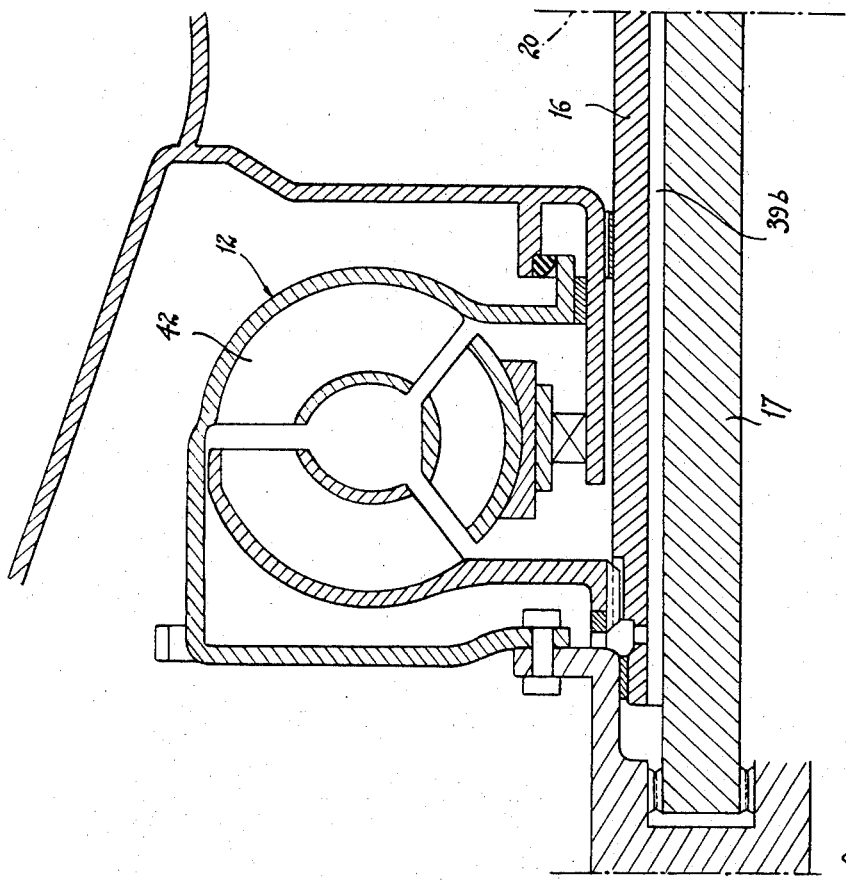

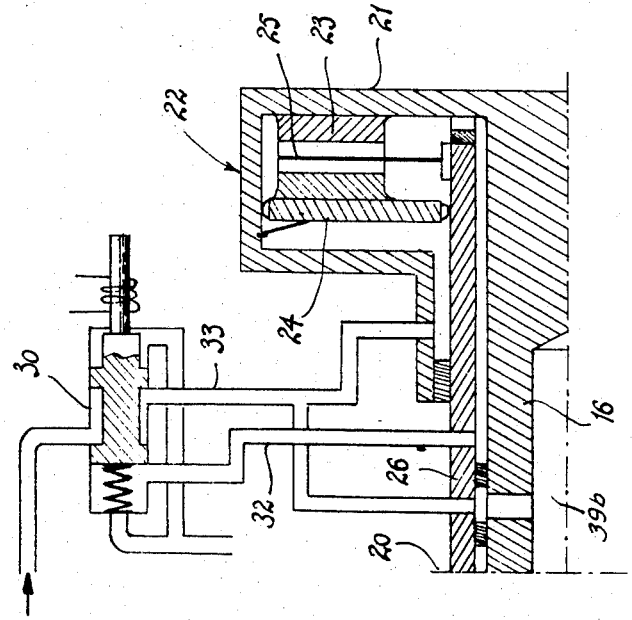
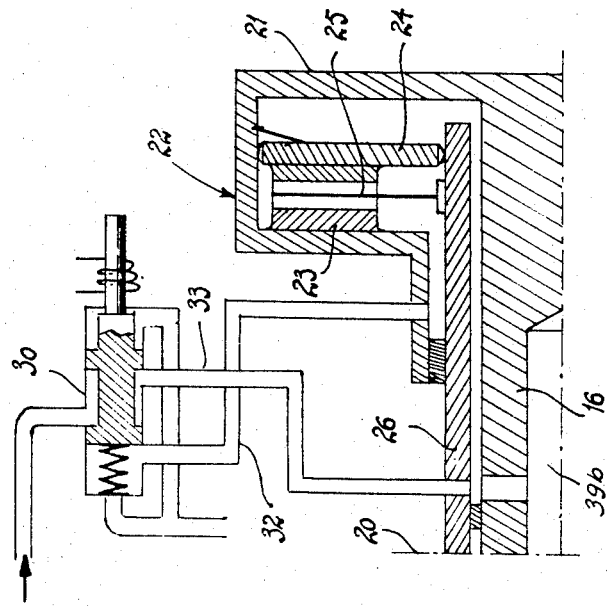

3,378,118
CENTRIFUGAL FLUID OPERATED CLUTCH FOR CONNECTING FLUID COUPLING TO TRANSMISSION
Jean Maurice, Paris, France, assignor to Societe Anonyme Francaise du Ferodo, Paris, France
Filed Jan. 28, 1966, Ser. No. 523,723
Claims priority, application France, Feb. 11, 1965, 5,141
6 Claims. (Cl. 192—3.33)

ABSTRACT OF THE DISCLOSURE

An automotive transmission comprises a drive shaft with a hydro-kinetic coupling device on one side of the output and the clutch plates on the other side of the output with reference to the axis of the drive shaft. A clutch chamber is delimited by a rotating wall that imparts centrifugal force to the fluid. At least a portion of the fluid supply follows a path between shafts concentric with the drive shaft.

---

The present invention relates to a transmission device, especially for automotive vehicles, in which the following act in succession, starting from a driving shaft: a hydro-kinetic coupling device (torque-converter or coupler) having an impeller wheel fixed for rotation with the driving shaft, and a turbine wheel hydraulically driven by the said impeller wheel; and a clutch device having a pair of plates coupled for rotation to the turbine wheel, and a friction disc intended to be gripped between the said plates and to drive a receiving means, for example a gearbox and/or a reversing gear.

In transmissions of this kind, the various elements are generally placed in the following order, following an axial direction: clutch device, hydro-kinetic coupling device, and receiving means.

This is especially the case in the transmissions described in French Patent No. 1,317,917, taken out on Dec. 12, 1961, by the Société Anonyme Française du Ferodo for: "Improvements in Clutches and a Transmission Device Comprising Said Improvements" and in the additions No. 81,461 of Apr. 7, 1962, and No. 82,016 of June 22, 1962, and No. 82,917 of Dec. 4, 1962, attached to the said patent. The clutch of such transmissions, which is controlled by hydraulic pressure, both for engagement and disengagement, has an excellent performance in respect of progressive engagement and also of rapid disengagement, and is of very robust construction.

The applicant has however found that in certain applications, the space occupied by the assembly formed by the hydro-kinetic coupling device and the clutch device represents an excessive overall bulk.

The transmission forming the subject of the present invention is free from this drawback, and is especially characterized in that the hydro-kinetic coupling device and the clutch device are arranged, in an axial direction, on each side of the receiving means, while the clutch device is operated, both for disengagement and engagement, by the pressures which exist respectively inside and outside the plates, so that the said clutch is disengaged when the pressure inside the plates is predominant, and is engaged when the pressure outside the plates is predominant.

In one preferred form of construction, the hydrokinetic coupling device is arranged between the motor and the receiving means, which the clutch device is arranged beyond this latter.

A wall, driven in rotation, is associated with the clutch in such manner that the pressure developed inside this wall and outside the clutch is subjected, at least in part, to the effects which result from the speed of this wall.

Forms of embodiment of the invention are described below by way of example, reference being made to the accompanying drawings, in which:

FIG. 1 is a diagrammatic view of a transmission according to the invention;

FIGS. 2, 3 and 4 relate respectively to three alternative forms.

In the form of construction shown in FIG. 1 which relates by way of example to an application of the invention to a transmission for automotive vehicles, there is seen at 10 the driving shaft, to which is rigidly fixed the bell 11 of a hydro-kinetic coupling device, constituted in this case by a torque-converter 12 comprising an impeller wheel 13, a turbine wheel 14 and a reactor wheel 15.

The impeller wheel 13 is rigidly fixed to the bell 11, coupled to the driving shaft 10. The turbine wheel 14 is hydraulically driven by the impeller wheel 13 and is coupled to a hollow shaft 16 surrounding a shaft 17 fixed to the driving shaft 10. The reactor wheel 15 is coupled by a free wheel 18 to a fixed sleeve 19 surrounding the shaft 16. The shaft 17 is fixed to a wall 21 forming a bell, in which is housed a clutch 22.

The clutch 22 is composed of two plates 23 and 24, arranged one with respect to the other in the relation of cylinder and piston, while a friction disc 25 is intended to be gripped between the plates 23 and 24.

The friction disc 25 is fast for rotation with a sleeve 26 surrounding the sleeve 16 and forming the intake shaft of a receiving means or output, for example a gearbox and/or reversing gear 20. In the example shown, the shafts 16 and 17 pass through the gear-box 20. The output of the gear-box 20 is constituted for example by a pinion intended to drive a shaft displaced parallel to the shafts 16, 17 and 26, and not shown in the drawing.

It should be noted that the receiving means could be constituted by any appropriate member or device other than the gear-box 20.

The construction of the clutch 22 may with advantage be wholly or partly of the type described in French Patent No. 1,317,917 taken out on Dec. 12, 1961, by the Société Anonyme Française du Forodo for "Improvements in Clutches and a Transmission Device Comprising said Improvements" and in the additions No. 81,461 of Apr. 7, 1962, No. 82,016 of June 22, 1962, and No. 82,917 of Dec. 4, 1962, attached to the said patent.

The actuation of the clutch 22 and the circulation in the converter 12 are effected by means of a pump 27 which takes its suction from a fixed tank 28 forming a fluid-tight casing which surrounds the transmission. The pump 27 is arranged in any suitable position, in such manner that its rotor is driven by any member, such as 11, 17, 21 or other, fixed to the driving shaft 10, while its stator is fixed to any fixed portion such as 19, 28 or other.

The oil delivered by the pump 27 is admitted through a conduit 29 into a distributor 30 having two positions, and comprising three other conduits 31, 32 and 33. The conduit 31 is a return conduit to the tank 28. The conduit 32 is a connection conduit with the space 34 which is formed between the shafts 26 and 16. This space 34 communicates with the chamber 35 formed between the plates 23 and 24. The conduit 33 communicates, for example by channels 36, with the chamber 37 which is inside the wall 21 and outside the plates 23 and 24. The channels 36 are carried by the wall 21 in such manner that the oil admitted into the said channels 36 is subjected to centrifugal force, depending on the speed of the wall 21 fixed for rotation with the driving shaft 10.

The chamber 37 communicates at 38 with the space 39 formed between the shafts 16 and 17. The space 39 communicates in its turn at 40 with the chamber 41, inside the bell 11 and outside the wheels 13, 14 and 15. From the chamber 41, the oil can proceed into the working circuit 42 of the converter 12 through the space 43 comprised between the wheels 13 and 14. The oil can return from the circuit 42 towards the tank 28 through the space 44 formed between the wheels 14 and 15, and by the space 44a formed between the casing and the shaft 16. When so required, a discharge valve may be provided at this point.

The slide-valve 45 of the distributor 30 is operated in dependence on the conditions of working of the gear-box 20, so as to take-up a first position in which the conduit 29 is coupled to the conduit 33, while the conduit 32 is coupled to the conduit 31, when the user does not operate the gear-changing lever and the gear-box is in a position other than neutral.

The distributor 30 takes up its other position in which the conduit 29 is coupled to the conduit 32 and the conduit 33 is connected to the conduit 31, when the user takes hold of the gear-lever or when the gear-box is in the neutral position.

A distributor control of this type is described in French Patent No. 1,317,917, taken out on Dec. 12, 1961, by the Société Anonyme Française du Ferodo for "Improvements in Clutches and a Transmission Device Comprising Said Improvements."

When the user leaves the gear-changing lever and the gear-box takes up a position other than neutral, the oil delivered into the conduit 29 by the pump 27 reaches the conduit 33 and then, after being centrifuged by the channels 36, passes into the chamber 37, which engages the clutch 22 by the effect of a preponderant pressure on the left-hand face of the plate 24, while the oil contained in the chamber 35 returns to the tank over the path 34, 32, 31. In addition, the oil from the chamber 37 passes over the path 38, 39, 40, 41 and 43 into the work circuit 42 of the converter 12, while ensuring an effective cooling circulation, the oil returning to the tank 28 through the spaces 44 and 44a.

When the user takes hold of the gear-changing lever for the purpose of changing the gears of the box 20 or alternatively if the gear-box 20 is in neutral, the oil delivered by the pump 27 passes over the path 29, 32, 34 into the inner chamber 35 of the clutch 22, which, by the effect of a preponderant pressure on the right-hand face of the plate 24, effects the disengagement of the clutch.

It will be appreciated that the transmission device shown in FIG. 1 comprises a convenient distribution of its various elements, converter, clutch, with respect to the gear-box 20 and the driving unit, while at the same time it has excellent performance in operation, by virtue of the hydraulic control both for the disengagement and for the engagement of the clutch 22.

In the alternative construction shown in FIG. 2, the arrangement is similar to that which has just been described with reference to FIG. 1, but the conduit 33, instead of supplying successively the chamber 37 and then the work circuit 42, is provided with a branch connection 50 to the space 39, the right-hand portion 39a of which supplies the chamber 37, while the left-hand portion 39b supplies the work circuit 42. In other words, in the case of FIG. 2, the chamber 37 and the circuit 42 are supplied in parallel instead of being in series as was the case of FIG. 1. The operation is otherwise similar to that which has been described with reference to FIG. 1.

In a further alternative construction shown in FIG. 3, the shaft 17 coupled to the driving shaft 10 is dispensed with, and it is the shaft 16 coupled to the turbine 14 which is rigidly fixed to the bell 21, which in this case forms at the same time the plate 23 of the clutch 22, while the other plate 24 is mounted so as to be axially slidable in the bell 21. The receiving means 20, which is arranged between the converter 12 and the clutch 22, is driven by the shaft 26 which is coupled to the friction disc 25 intended to be gripped between the plates 23 and 24. There can be seen at 30 the distributor which provides a control similar to that which has been described previously.

In FIG. 3, the plate 23 is arranged at the side nearest the receiving means 20, while the plate 24 is mounted on the outer side, but it would also be possible to adopt the reverse arrangement, which has been shown in FIG. 4. FIG. 4 is otherwise like FIG. 3 in construction and operation, except that the conduit 32 communicates with the inner clutch chamber through the passage between shafts 16 and 26, and the conduit 33 communicates with the outer clutch chamber through a radially inner portion of bell 21. As in FIGS. 1 and 2, the torque converter is supplied from conduit 33 in FIGS. 3 and 4 through the space 39b within shaft 16.

It will of course be understood that the invention is not limited to the forms of construction described and shown, but includes all its alternative forms. For example, the channels 36 may be dispensed with if so required; the plate 24 could be kept in the engaged position, when stopped, by elastic means of the Belleville washer type, etc.

What I claim is:

1. A transmission for automotive vehicles, comprising a driving shaft, a hydro-kinetic coupling device having an impeller wheel fixed for rotation with said driving shaft and a turbine wheel hydraulically driven by said impeller wheel, a clutch device comprising a pair of plates coupled for rotation to said turbine wheel and a friction disc adapted to be gripped between said plates, means defining an inner clutch chamber between said plates and an outer clutch chamber outside said plates, an output driven by said friction disc, said hydro-kinetic coupling device and said clutch device being disposed on axially opposite sides of said output, means for operating said clutch device comprising means for varying the fluid pressures in said chambers so that the clutch device is disengaged when the pressure in said inner clutch chamber is predominant and is engaged when the pressure in said outer clutch chamber is predominant, an outwardly extending wall at least partly enclosing said outer clutch chamber, and means for rotatably driving the wall from said driving shaft.

2. A transmission for automotive vehicles, comprising a driving shaft, a hydro-kinetic coupling device having an impeller wheel fixed for rotation with said driving shaft and a turbine wheel hydraulically driven by said impeller wheel, a clutch device comprising a pair of plates coupled for rotation to said turbine wheel and a friction disc adapted to be gripped between said plates, means defining an inner clutch chamber between said plates and an outer clutch chamber outside said plates, an output driven by said friction disc, said hydro-kinetic coupling device and said clutch device being disposed on axially opposite sides of said output, means for operating said clutch device comprising means for varying the fluid pressures in said chambers so that the clutch device is disengaged when the pressure in said inner clutch chamber is predominant and is engaged when the pressure in said outer clutch member is predominant, and a wall driven in rotation by said transmission and enclosing at least a portion of said outer clutch chamber, said wall extending radially outwardly past said plates, and means for admitting hydraulic fluid for operating the clutch device to said outer clutch chamber at a radially inner portion of said wall.

3. A transmission as claimed in claim 2, and centrifugal-action channels extending radially outwardly from said admitting means and carried by said wall to increase the centrifugal force to which said admitted hydraulic fluid is subjected upon rotation of the wall.

4. A transmission for automotive vehicles, comprising a driving shaft, a hydro-kinetic coupling device having an impeller wheel fixed for rotation with said driving shaft and a turbine wheel hydraulically driven by said impeller wheel, a clutch device comprising a pair of plates coupled for rotation to said turbine wheel and a friction disc adapted to be gripped between said plates, means defining an inner clutch chamber between said plates and an outer clutch chamber outside said plates, an output driven by said friction disc, said hydro-kinetic coupling device and said clutch device being disposed on axially opposite sides of said output, means for operating said clutch device comprising means for varying the fluid pressures in said chambers so that the clutch device is disengaged when the pressure in said inner clutch chamber is predominant and is engaged when the pressure in said outer clutch chamber is predominant, and fluid pressure means and fluid distribution means adapted to supply both said clutch device and the work circuit of said hydro-kinetic device, a first shaft rotatably coupled to said driving shaft, a wall secured to said first shaft and enclosing at least a portion of said outer clutch chamber, and a second shaft which connects said turbine wheel to the clutch plates, said first and second shafts being concentric with each other and having a space therebetween, and means for supplying hydraulic fluid to said work circuit through said space between said first and second shafts.

5. A transmission as claimed in claim 4, said last-named means supplying hydraulic fluid first to said outer clutch chamber and then to the work circuit of said hydro-kinetic device.

6. A transmission as claimed in claim 4, said last-named means supplying hydraulic fluid in parallel to said outer clutch chamber and to the work circuit of said hydro-kinetic device.

References Cited
UNITED STATES PATENTS

| | | | |
|---|---|---|---|
| 2,536,737 | 1/1951 | Gerst | 74—730 |
| 3,202,018 | 8/1965 | Hilpert | 192—3.3 X |
| 3,213,988 | 10/1965 | Maurice et al. | 192—3.33 X |

FOREIGN PATENTS

| | | |
|---|---|---|
| 1,254,570 | 1/1961 | France. |

BENJAMIN W. WYCHE, III, *Primary Examiner.*